United States Patent [19]

Ames et al.

[11] Patent Number: 4,890,979
[45] Date of Patent: Jan. 2, 1990

[54] NO-BACK APPARATUS FOR PROPELLER PITCH CONTROL

[75] Inventors: John E. Ames, Rockford; Bruce A. Krandel, Cherry Valley; Allyn M. Aldrich, Rockford, all of Ill.

[73] Assignee: Sundstrand Corporation, Rockford, Ill.

[21] Appl. No.: 225,383

[22] Filed: Jul. 28, 1988

[51] Int. Cl.$^4$ .............................................. B64C 11/34
[52] U.S. Cl. ....................................... 416/46; 416/153; 416/160
[58] Field of Search ................. 416/151, 152, 160, 46, 416/153

[56] References Cited

U.S. PATENT DOCUMENTS

| | | | |
|---|---|---|---|
| 2,376,673 | 5/1945 | Duchaussoy | 416/151 |
| 2,504,737 | 4/1950 | Sharpes . | |
| 2,763,328 | 9/1956 | Sullivan et al. | 416/153 |
| 2,793,703 | 5/1957 | Mergen et al. | 416/152 |
| 2,947,364 | 8/1960 | Haworth . | |
| 3,003,567 | 10/1961 | Flaugh et al. | 416/46 |
| 3,087,554 | 4/1963 | Conn et al. | 416/46 |
| 3,186,492 | 6/1965 | Chillson et al. | 416/43 X |
| 3,484,176 | 12/1969 | Quenneville | 416/46 X |
| 3,866,415 | 2/1975 | Ciokajlo | 416/160 X |
| 3,893,789 | 7/1975 | Andrews | 416/160 |
| 3,895,884 | 7/1975 | Andrews | 416/153 |
| 3,910,721 | 10/1975 | McMurtry | 416/160 |
| 4,047,842 | 9/1977 | Avena et al. | 416/152 |
| 4,480,733 | 11/1984 | Grimm et al. | 192/8 R |

Primary Examiner—Everette A. Powell, Jr.
Attorney, Agent, or Firm—Antonelli, Terry & Wands

[57] ABSTRACT

An improved no-back mechanism for propeller pitch control comprises a brake which resists motion of a first member and a uni-directional coupling between the first member and a drive connecting a pitch control prime mover to an adjustable pitch propeller. The coupling permits limited movement of the drive with respect to the first member during back driving as in dither cycling of the blade while coupling the drive and first member for braking the back driving after the limited movement. As a result, dither cycling can occur during normal operation without release or slipping of the brake, thereby effecting a substantial wear reduction of brake plates of the brake.

11 Claims, 3 Drawing Sheets

NO-BACK APPARATUS FOR PROPELLER PITCH CONTROL

FIELD OF THE INVENTION

The present invention is directed to a no-back, or anti-backdriving, apparatus for preventing substantial back driving of the blade pitch of an adjustable pitch propeller from windage in the event of loss of use of a pitch control prime mover.

BACKGROUND ART

Prop fan engine propeller pitch control requires that in the event of loss of the blade pitch prime mover, blade pitch must be maintained in the realm of cruise setting, or advanced to "feather", i.e., where the blade is streamline to the air stream. In the absence of control from the blade pitch prime mover, windage tends to drive the blades to fine pitch, resulting in an immediate severe rotational engine overspeed, and very likely catastrophic failure of major rotating components. It is known to provide a no-back mechanism to prevent this back driving of the blade pitch in the event of loss of use of the blade pitch prime mover.

During normal operation of an adjustable pitch propeller, the blades will be subject to small pitch changes, "dither", on a regular basis. This is caused by a change in pitch induced by the air stream interacting with the propeller followed by a correction in the opposite direction induced by the blade pitch control system which tries to maintain a constant rotational speed of the blade assembly. In known no- o back mechanisms a brake is employed for resisting the back driving motion and the brake is typically activated and deactivated to perform this control reaction, that is, the brake is released in the decreasing pitch portion of the dither cycle. It has been found that this repetitive activation and deactivation of the brake with dither can result in premature wearing of the no-back mechanism brake.

Various types of pitch control mechanisms and no-back mechanisms are shown in U.S. Pat. Nos. 2,504,737; 2,947,364; 4,047,842 and 4,480,733.

DISCLOSURE OF INVENTION

An object of the present invention is to provide an improved no-back mechanism for preventing substantial back driving of the blade pitch from windage in the event of loss of use of the pitch control prime mover, which avoids the aforementioned disadvantages of the known no-back mechanisms.

More particularly, an object of the invention is to provide an improved no-back mechanism and a propeller blade pitch control apparatus incorporating the same which are capable of preserving propeller pitch setting with both partial and complete loss of pitch control prime mover while substantially reducing brake wear in the presence of small oscillatory pitch changes as in dither.

These and other objects of the invention are attained by the no-back apparatus for propeller pitch control of the invention. The no-back apparatus of the invention is for preventing substantial back driving of the blade pitch of an adjustable pitch propeller from windage in the event of loss of use of a pitch control prime mover normally used for adjusting the blade pitch of the propeller by way of a drive means driveably connecting the pitch control prime mover to the adjustable pitch propeller. The no-back apparatus comprises a first member, means resisting motion of the first member and means for coupling the first member and the drive means so as to permit limited movement of the drive means with respect to the first member during back driving as in dither cycling of the propeller blade during normal operation while coupling the drive means and the first member for resisting back driving after the limited movement. The limited movement is of a predetermined magnitude which normally exceeds the back driving movement associated with the decreasing pitch half-cycle displacement of the dither cycle which occurs during normal operation. Thus, the small displacement low frequency blade oscillation or dither can occur through the no-back apparatus of the invention without requiring release of the brake or other motion resisting means thereby effecting a substantial wear reduction of components of the motion resisting means.

In the disclosed form of the invention, the coupling means is a uni-directional coupling. The first member and a cooperating portion of the drive means are in the form of respective rings, one of the rings being located within the other for relative rotation. The coupling means permits limited rotary movement of the ring of the drive means with respect to the ring of the first member during back driving as in dither cycling of the blade while coupling the ring of the drive means and the ring of the first member for resisting back driving after the limited movement.

The coupling means comprises a plurality of spaced ratchet stops provided on one of the rings of the first member and the drive means and a plurality of spaced ratchet pawls provided on other of the rings of the first member and the drive means. The spacing of the ratchet stops and ratchet pawls determines the extent of the limited movement of the drive means with respect to the first member during back driving of the blade pitch of an adjustable pitch propeller from windage in the event of loss of use of the pitch control prime mover. The coupling means does not resist motion of the drive means relative to the first member when adjusting the blade pitch in a direction opposite to that which occurs during back driving from windage in the event of loss of use of the pitch control prime mover.

The motion resisting means in the disclosed form of the invention is a brake and the ring of the first member is a brake hub of the brake. The brake further includes a brake plate connected to the brake hub for rotation therewith, stationary brake plate for contacting respective sides of the brake plates and means for pressing the stationary brake plates against the brake plate connected to the brake hub. The stationary brake plates are connected to their supporting structure and the rotary brake plate is connected to the brake hub by respective spline connections to permit sliding movement of the brake plates along their supporting members.

According to a further feature of the invention, the no-back apparatus comprises means for releasing the pressing means from pressing the stationary plates against the rotary brake plate of the brake hub in response to driving of the drive means by the pitch control prime mover for adjusting the blade pitch of the adjustable pitch propeller in the same direction as that during driving of the blade pitch of the propeller from windage in the event of loss of use of the pitch control prime mover. This deactivation of the brake during control by the pitch control prime mover is accomplished in the disclosed embodiment by way of a ballramp coupling located between respective adjacent rings of the drive means. The ball-ramp coupling permits a direct drive through the coupled rings when rotated in a first direction while causing at least one of the rings to be axially moved with respect to the other when the drive is in the opposite direction corresponding to blade pitch adjustment in the same direction of that during back driving from windage in the event of loss of use of a pitch control prime mover. Axial movement of the at least one ring, in turn, causes release of the brake to permit such back driving by the pitch control prime mover.

The propeller blade pitch control apparatus of the invention is thus seen to comprise an adjustable pitch propeller, a pitch control prime mover, driver means connecting the pitch control prime mover to the adjustable pitch propeller so that the pitch control prime mover can drive the adjustable pitch propeller for controlling the blade pitch of the propeller and a no-back mechanism for preventing substantial back driving of the blade pitch from windage in the event of loss of use of the pitch control prime mover. The no-back mechanism comprises a brake which resists motion of a first member and uni-directional coupling means coupling the first member and the drive means to permit limited movement of the drive means with respect to the first member during back driving as in dither cycling of the blade while coupling the drive means and the first member for braking the back driving after the limited movement.

These and other objects, features and advantages of the present invention will become more apparent from the following description when taken in connection with the accompanying drawings, which show, for purposes of illustration only, one preferred embodiment in accordance with the present invention.

BEST MODE FOR CARRYING OUT THE INVENTION

Figure 1:
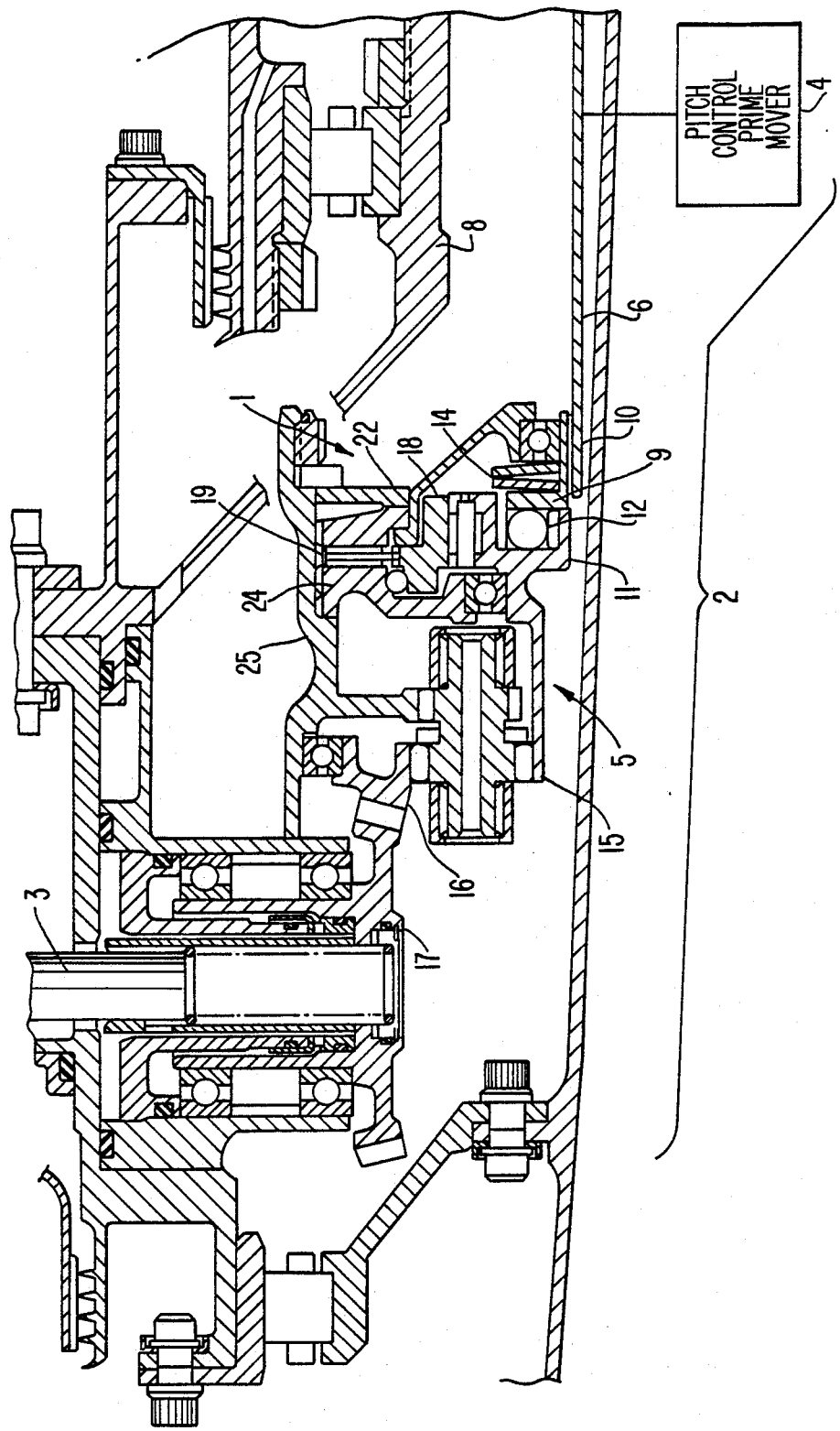
FIG. 1 is a cross-sectional view through a portion of a prop fan engine having an adjustable pitch propeller and illustrating the no-back apparatus therefor according to the present invention.

Referring now to the drawings, a no-back apparatus 1 of the invention is shown in FIG. 1 of the drawings. The no-back apparatus is part of a propeller blade pitch control apparatus 2 of the invention which comprises an adjustable pitch propeller 3 shown only partially in FIG. 1, a pitch control prime mover 4 shown schematically in FIG. 1 and a driving arrangement generally indicated at 5 driveably connecting the pitch control prime mover 4 to the adjustable pitch propeller 3. The propeller blade pitch control apparatus 2 is part of a prop fan engine for an aircraft.

The no-back apparatus 1 of the invention serves to preserve propeller pitch setting in both partial and complete loss of use of the pitch control prime mover 4.

This is accomplished in the disclosed embodiment by means of a mechanically actuated servo-brake operated in conjunction with a ratchet or uni-directional shaft coupling. In addition, lost motion is introduced between the driving member of the driving arrangement 5 and the uni-directional coupling for the purpose of reducing brake wear in the presence of small oscillatory pitch changes such as those in dither.

Figure 2:
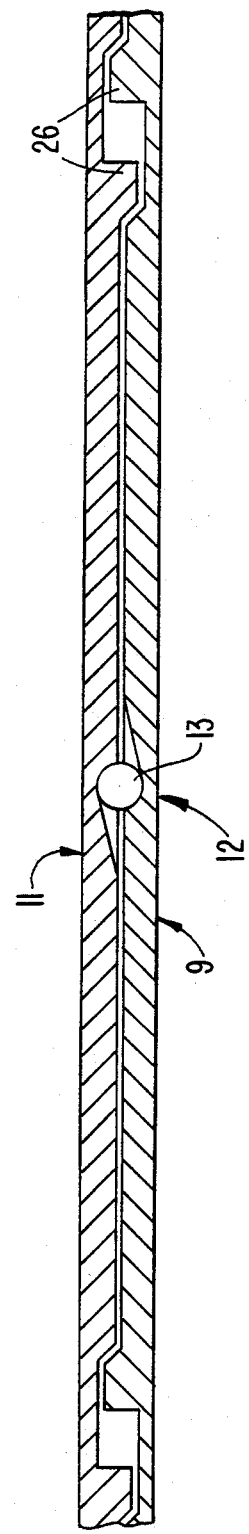
FIG. 2 is a plan view of a portion of a pair of cooperating rings having a ball-ramp coupling therebetween taken from the direction A in FIG. 1.

More specifically, as shown in FIG. 1, the driving arrangement 5 comprises a control shaft 6 which rotates about the engine center line 7 with propeller blade ring hub structure 8. The control shaft 6 is rotated exactly with the blade ring hub structure 8 by means of the pitch control prime mover 4 to maintain constant pitch of the fan blades. In the normal operating mode (all except feather and thrust reverse), the load presented by the blades to the shaft 6 is directed toward decreasing the pitch of the blades. For a pitch increase command, torque and motion are transmitted from the prime mover 4 through the control shaft 6 to a ring 9. The transmission from the control shaft 6 to the ring 9 is by way of a spline 10. The direction of rotation of control shaft 6, with respect to the blade ring structure 8, determines the pitch change magnitude and direction of the blades. During pitch increase, rotation of the control shaft 6 by the prime mover 4 causes ring 9 to rotate which, in turn, rotates an adjacent ring 11 by way of a ball-ramp coupling 12 as shown in FIG. 2. In particular, torque transmission from ring 9 to ring 11 is accomplished by loading balls 13 of the coupling 12 which are contained in suitably contoured recesses in the respective rings. For increasing pitch, the angle presented to the balls by the recesses is such as to provide substantial tangential loading, and separation between rings 9 and 11 is precluded by loading from springs 14.

Rotation of the ring 11 by the prime mover 4 is transmitted to a compound planetary sun gear 15 shown in FIG. 1. Output from the gearset is a gear 16, consisting of both the planetary output ring gear and a bevel gear, the latter meshing with bevel pinions 17, which are connected by shafting to the fan blades of the propeller. One pinion and shaft can be included for each fan blade of the propeller, although other combinations such as one shaft and pinion for two blades can be employed.

The ring 11 of the driving arrangement 5 is surrounded by a ring 18 of the no-back apparatus 1. The ring 18 is in the form of a brake hub having a movable brake plate 19 mounted thereon for rotation with the ring 18. Relative motion between the ring 11 and ring 18 is controlled by ratchet pawls 20 which are configured to overrun in the pitch increase direction as shown in detail in FIG. 3.

In the event that the prime mover 4 driven by the control shaft 6 is unable to sustain the combined blade back driving loads in the presence of a pitch increase or pitch neutral command, i.e., loss of use of the pitch control prime mover, motion between the ring 11 and the ring 18 is limited by engagement of the pawls 20 in ratchet stops 21 provided in the ring 18. In this instance, motion of the ring 18 and, hence, back driving for reducing a blade pitch is resisted in that the ring 18 is grounded to the hub structure 8 by the combined action of a disk spring 22 acting on stationary brake plates 23 and 24, which load movable brake plate 19, the latter being spline coupled to brake hub 18. Plates 23 and 24 are also spline connected to housing 25, which is hard connected to the hub structure 8.

Figure 3:
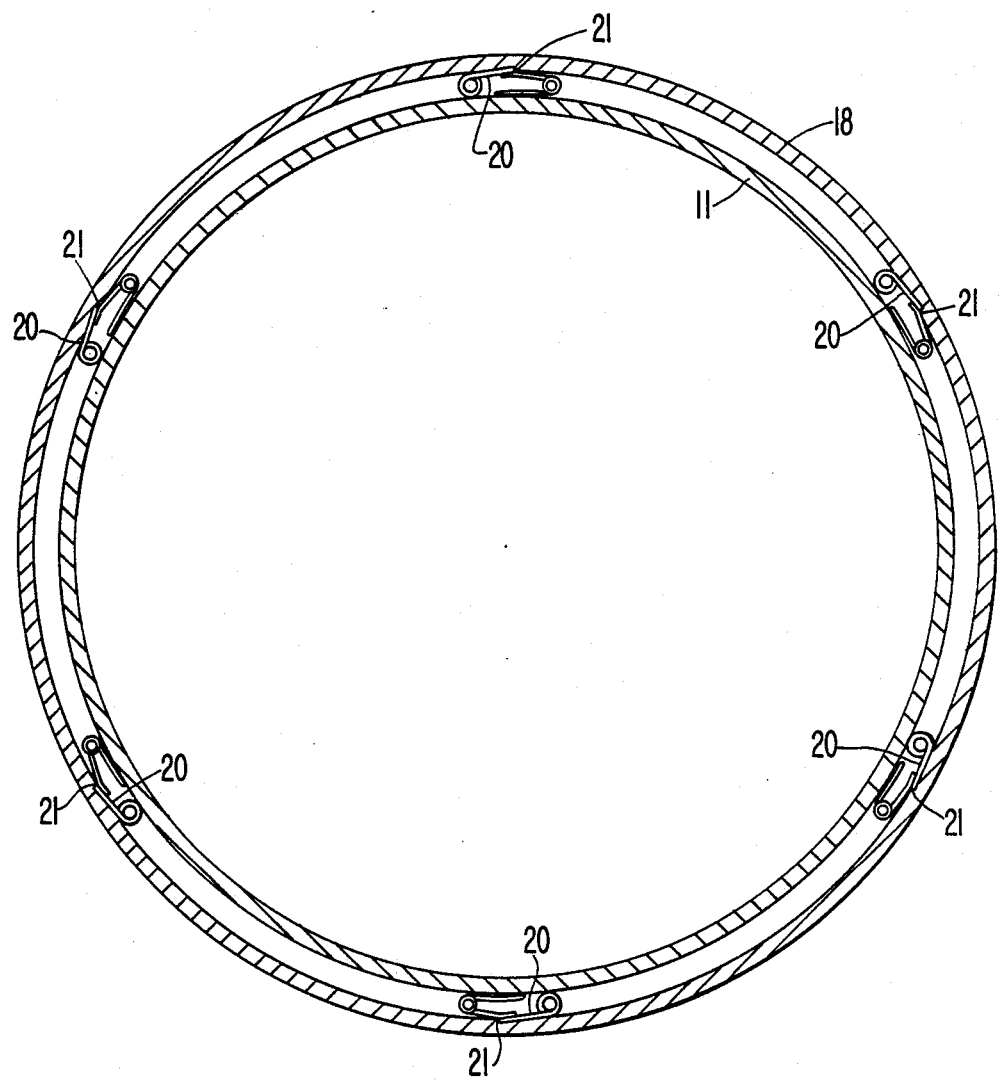
FIG. 3 is a cross-sectional view through a portion of the no-back apparatus of FIG. 1 taken along the line III—III and illustrating the lost motion connection between a ring of the drive for the adjustable pitch propeller and a ring connected to a brake hub of a brake in the no-back apparatus.

A significant feature of the no-back apparatus 1 of the invention is the substantial, but limited, motion allowed between rings 11 and 18 in the back driving mode, set by appropriate spacing of the ratchet stops 21 shown in FIG. 3. In normal operation, small displacement, low frequency blade oscillation, referred to as "dither", is anticipated over a major portion of the flight profile. When the decreasing pitch half-cycle displacement of the dither cycle is of insufficient magnitude to cause pawl engagement with the ratchet stops, dither cycling can be continued without release of the pressure of disk spring 22 on the brake plates 23 and 24 biasing them against movable brake plate 19, thereby effecting roughly a ten-fold wear reduction of movable brake plate 19. Before decreasing pitch commands under the control of the prime mover 4, tangential loads from input ring 9 are reacted by the ramps of the ball-ramp coupling 12, thus producing an axial load and motion component sufficient to bottom loading springs 14 and diminish loading of disk spring 2 on movable brake plate 19 sufficiently to allow motion in the decreasing pitch direction with ratchet pawls 20 engaged against their respective ratchet stops 1. Stops 26 are provided in the ring 11 to limit the relative rotation of the rings 9 and 11 in the presence of pitch decrease commands after the braking pressure on the movable brake plate 19 has been released. The ramps of the ball-ramp coupling 12 are uni-directional, i.e., they release the brake in only the pitch decrease mode of operation of the prime mover 4, so that the no-back mechanism will not fail to function and resist blade pitch decrease in the event that the torque from the prime mover is insufficient to sustain the normal resistive loads. This can occur as a result of impaired performance of the prime mover, excessive drag or inertia loading.

Thus, with the propeller blade pitch control apparatus 2 of the present invention, during normal operation, the blades will dither on a regular basis. This is caused by the change in pitch induced by the air stream followed by a correction in the opposite direction induced by the control system which tries to maintain a constant rotational speed of the blade assembly. Known systems would typically activate and de-activate the brakes to perform this control reaction. Since the dither cycle is approximately one second between corrections, significant brake wear will normally be experienced under the known control technique. However, with the control apparatus 2 of the invention, the brake is not activated and deactivated in this manner. While we have shown and described only one embodiment in accordance with the present invention, it is understood that the same is not limited thereto, but is susceptible of numerous changes and modifications as known to those skilled in the art. Therefore, we do not wish to be limited to the details shown and described herein, but intend to cover all such changes and modifications as are encompassed by the scope of the appended claims.

We claim:

1. A no-back apparatus for preventing substantial back driving of the blade pitch of an adjustable pitch propeller from windage in the event of loss of use of a pitch control prime mover normally used for adjusting the blade pitch of the propeller by way of a drive means driveably connecting the pitch control prime mover to the adjustable pitch propeller said no-back apparatus comprising a first member, means resisting motion of said first member and means for coupling said first member and said drive means so as to permit limited movement of said drive means with respect to said first member during back driving as in dither cycling of the propeller blade during normal operation while coupling said drive means and said first member for resisting back driving after said limited movement.

2. A no-back apparatus according to claim 1, wherein said coupling means comprises a plurality of spaced ratchet stops provided on one of said first member and said drive means and a plurality of spaced ratchet pawls provided on the other of said first member and said drive means for permitting said limited movement of said drive means with respect to said first member during back driving as in dither cycling of the blade while coupling said drive means and said first member for resisting back driving after said limited movement.

3. A no-back apparatus according to claim 1, wherein said first member and a cooperating portion of said drive means are in the form of respective rings, one of said rings being located within the other, said coupling means permitting limited rotary movement of the ring of said drive means with respect to the ring of said first member during back driving as in dither cycling of the blade while coupling said ring of the drive means and the ring of said first member for resisting back driving after said limited movement.

4. A no-back apparatus according to claim 3, wherein said motion resisting means is a brake and the ring of said first member is a brake hub of said brake, said brake further including a brake plate connected to said brake hub for rotation therewith, stationary brake plates for contacting respective sides of said stationary brake plate and means for pressing said brake plates against said brake plate connected to said brake hub.

5. A no-back apparatus according to claim 4, wherein said brake plate is connected to said brake hub by a spline connection to permit sliding movement of said brake plate along said brake hub.

6. A no-back apparatus according to claim 4, further comprising means for releasing said pressing means from pressing said stationary plates against said brake plate of said brake hub in response to driving by said drive means of said pitch control prime mover for adjusting the blade pitch of the adjustable pitch propeller in the same direction that during back driving of the blade pitch of the propeller from windage in the event of loss of use of the pitch control prime mover.

7. A no-back apparatus according to claim 1, further comprising means for deactivating said resisting means during adjustment of the blade pitch of said propeller with said pitch control prime mover when the adjustment of said blade pitch is in the same direction as that during back driving from windage in the event of loss of use of a pitch control prime mover.

8. A no-back apparatus according to claim 7, wherein said means for deactivating includes a ballramp coupling between respective, adjacent rings of said drive means for axially moving at least one of said rings with respect to the other when said drive means is moved by said pitch control prime mover in said same direction.

9. A no-back apparatus according to claim 8, wherein said resisting means is a brake and said deactivating means further includes means responsive to axial movement of said at least one ring for releasing said brake.

10. A no-back apparatus according to claim 1, wherein said coupling means is a uni-directional coupling.

11. A propeller blade pitch control apparatus comprising an adjustable pitch propeller, a pitch control prime mover, driving means connecting said pitch control prime mover to said adjustable pitch propeller so that the pitch control prime mover can drive the adjustable pitch propeller for controlling the blade pitch of the propeller and a no-back mechanism for preventing substantial back driving of the blade pitch from windage in the event of loss of use of the pitch control prime mover, said no-back mechanism comprising a brake resisting motion of a first member and uni-directional coupling means coupling said first member and said drive means to permit limited movement of said drive means with respect to said first member during back driving as in dither cycling of the blade while coupling said drive means and first member for braking said back driving after said limited movement.

* * * * *